US011218028B2

United States Patent
Choi et al.

(10) Patent No.: US 11,218,028 B2
(45) Date of Patent: Jan. 4, 2022

(54) MULTI-LEVEL POWER COMPATIBLE WIRELESS POWER RECEIVING APPARATUS

(71) Applicant: LG ELECTRONICS INC., Seoul (KR)

(72) Inventors: Hyengcheul Choi, Seoul (KR); Bongsik Kwak, Seoul (KR); Seong Hun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/739,749

(22) Filed: Jan. 10, 2020

(65) Prior Publication Data

US 2021/0075270 A1    Mar. 11, 2021

(30) Foreign Application Priority Data

Sep. 9, 2019 (KR) .......................... 10-2019-0111698

(51) Int. Cl.
*H02J 50/40* (2016.01)
*H02J 50/12* (2016.01)
(Continued)

(52) U.S. Cl.
CPC ............ *H02J 50/402* (2020.01); *H02J 50/12* (2016.02); *H01F 38/14* (2013.01); *H02J 50/80* (2016.02)

(58) Field of Classification Search
CPC .......................... B60L 53/12–126; H01F 38/14
See application file for complete search history.

(56) References Cited

U.S. PATENT DOCUMENTS

2009/0067207 A1*  3/2009  Nishino ................. H02M 7/08
                                                            363/126
2011/0241437 A1*  10/2011  Kanno ..................... H01F 38/14
                                                            307/104
(Continued)

FOREIGN PATENT DOCUMENTS

EP          1 898 510 A1    3/2008
KR        10-1118471 B1    3/2012
(Continued)

OTHER PUBLICATIONS

Vijayakumaran Nair, Vijith, and Jun R. Choi, "An Efficiency Enhancement Technique for a Wireless Power Transmission System Based on a Multiple Coil Switching Technique", Mar. 3, 2016, Energies 9, No. 3: 156. https://doi.org/10.3390/en9030156 (Year: 2016).*

*Primary Examiner* — Hal Kaplan
*Assistant Examiner* — David A Shiao
(74) *Attorney, Agent, or Firm* — Birch, Stewart, Kolasch & Birch, LLP (57) ABSTRACT

The present disclosure relates to a wireless power receiving apparatus capable of receiving multi-level power transmitted by a wireless power transmitting apparatus. According to an embodiment of the present disclosure, the wireless power receiving apparatus includes a first receiving coil in which induced current is generated by electromagnetic induction, a second receiving coil connected in series with the first receiving coil by a switch, and a processor that is driven based on the induced current generated by the first receiving coil and controls the switch based on power information included in the induction current to selectively connect the first receiving coil and the second receiving coil.

13 Claims, 10 Drawing Sheets

(51) Int. Cl.
*H01F 38/14* (2006.01)
*H02J 50/80* (2016.01)

(56) References Cited

U.S. PATENT DOCUMENTS

| | | | |
|---|---|---|---|
| 2012/0025623 A1 | 2/2012 | Low et al. | |
| 2014/0265614 A1* | 9/2014 | Kim | H02J 7/00034 307/104 |
| 2015/0035372 A1* | 2/2015 | Aioanei | H02J 50/12 307/104 |
| 2016/0141881 A1* | 5/2016 | Hassan-Ali | H02J 50/10 307/104 |
| 2017/0040692 A1* | 2/2017 | Peralta | H02J 50/80 |
| 2017/0288463 A1* | 10/2017 | Nakahara | H02J 50/40 |
| 2018/0013309 A1* | 1/2018 | Winkler | H02J 50/12 |
| 2018/0034506 A1* | 2/2018 | Moore | H04B 5/0093 |
| 2018/0269728 A1* | 9/2018 | Liu | H01F 27/29 |
| 2019/0131823 A1 | 5/2019 | Ahn et al. | |
| 2020/0412169 A1* | 12/2020 | Chen | H02J 50/402 |
| 2021/0066952 A1* | 3/2021 | Chen | H02J 50/80 |

FOREIGN PATENT DOCUMENTS

| | | | |
|---|---|---|---|
| KR | 10-2013-0041981 A | 4/2013 | |
| KR | 10-2015-0125525 A | 11/2015 | |
| KR | 10-2016-0063004 A | 6/2016 | |
| KR | 10-2016-0123932 A | 10/2016 | |
| KR | 10-1670128 B1 | 10/2016 | |
| KR | 10-2019-0048925 A | 5/2019 | |
| WO | WO 2015/140917 A1 | 9/2015 | |
| WO | WO-2015140917 A1 * | 9/2015 | H02J 50/402 |
| WO | WO 2017/144387 A1 | 8/2017 | |

* cited by examiner

FIG. 1

RELATED ART

MULTI-LEVEL POWER COMPATIBLE WIRELESS POWER RECEIVING APPARATUS

CROSS-REFERENCE TO RELATED APPLICATION

The present application claims priority to and the benefit of Korean Patent Application No. 10-2019-0111698, filed on Sep. 9, 2019, the disclosure of which is incorporated herein by reference in its entirety.

BACKGROUND

1. Field of the Invention

The present disclosure relates to a wireless power receiving apparatus capable of receiving multi-level power transmitted by a wireless power transmitting apparatus.

2. Description of Related Art

In a related art, one of the methods for charging batteries can include a method for supplying terminals. The method for supplying the terminals can include receiving commercial power and converting the commercial power into voltage and current suitable for batteries, and supplying power to the batteries through charging terminals.

However, such a method for supplying the terminals can cause a momentary discharge phenomenon, sparks, fire due to potential difference between the charging terminals of the batteries and the power supply terminals of commercial power sources. Accordingly, wireless charging methods using wireless power transmission have been proposed.

The wireless charging method can be performed by a wireless power transmitting apparatus and a wireless power receiving apparatus, and the power can be transferred from the wireless power transmitting apparatus to the wireless power receiving apparatus through electromagnetic induction between the two apparatuses.

However, through such a wireless charging method, transmitting coils in the wireless power transmitting apparatuses and receiving coils in the wireless power receiving apparatuses can be self-coupled. When the wireless power transmitting apparatus and the wireless power receiving apparatus are produced separately, the two apparatuses may not be compatible with each other, thereby degrading magnetic coupling between the transmitting coil and the receiving coil for wireless power transmission.

In order to solve this problem, KR Patent No. 10-1670128 (hereinafter; referred to as "the related art document") discloses a technology for improving compatibility of the wireless power receiving apparatus.

Figure 1:
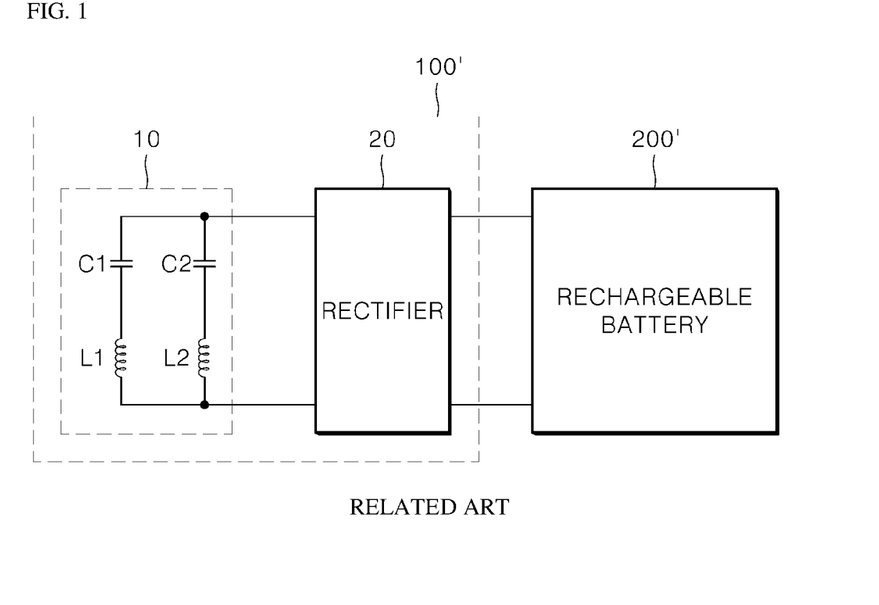
FIG. 1 shows an operation of a wireless power receiving apparatus according to a related art.

FIG. 1 shows an operation of a wireless power receiving apparatus according to a related art.

Referring to FIG. 1, a wireless power receiving apparatus 100' can include a receiver 10, and the receiver 10 can include a first resonance circuit (e.g., L1 and C1) and a second resonance circuit (e.g., L2 and C2) connected to each other in parallel. A rectifier 20 can rectify current received at the receiver 10 to be provided to a rechargeable battery 200'.

That is, according to the related art document, the wireless power receiving apparatus 100' can receive the current through at least one of the first resonance circuit (e.g., L1 and C1) and the second resonance circuit (e.g., L2 and C2) based on resonance frequency of the wireless power transmitting apparatus, thereby improving compatibility with the resonance frequency of the wireless power transmitting apparatus.

Meanwhile, wireless charging methods have been used for various types of terminals having different sizes and power consumptions of batteries, for example, smart phones, tablets, notebooks, TVs, and the like. Various types of power transmitting apparatuses can transmit power having various types of levels to charge terminals.

As described above, even according to the related art document, based on the wireless power transmitting apparatus transmitting power having the same resonance frequency and having different sizes, the wireless power receiving apparatus may not provide compatibility with the wireless power transmitting apparatus.

For example, when a smart phone (i.e., wireless power receiving apparatus) is charged with a wireless power transmitting apparatus to charge a notebook, an amount of power received at the smart phone can be limited to sizes of receiving coils inside of the smart phone, thereby greatly degrading power transmission efficiency. For this reason, smart phones may not provide compatibility with wireless power transmitting apparatuses for notebook charging.

As described above, there is a demand for a wireless power receiving apparatus capable of receiving multi-level power due to a difference between the amount of power transmitted by the wireless power transmitting apparatus and the amount of power that can be received at the wireless power receiving apparatus.

SUMMARY OF THE INVENTION

The present disclosure provides a wireless power receiving apparatus capable of receiving multi-level power.

The present disclosure also provides a wireless power receiving apparatus capable of receiving a multi-level power without expanding an area where receiving coils are disposed.

The present disclosure further provides a wireless power receiving apparatus that receives power by combining a full-bridge rectifying circuit and a half-bridge rectifying circuit.

The objects of the present disclosure are not limited to the above-mentioned objects, and other objects and advantages of the present disclosure which are not mentioned can be understood by the following description and more clearly understood by the embodiments of the present disclosure. It will also be readily apparent that the objects and the advantages of the present disclosure can be implemented by features described in claims and a combination thereof.

According to the present disclosure, a multi-level power can be received by electrically connecting two receiving coils in series or electrically separating two receiving coils from each other based on an amount of power transmitted by the wireless power transmitting apparatus.

Further, according to the present disclosure, by placing one of the two receiving coils electrically connected or electrically separated (e.g., electrically disconnected) based on the amount of power transmitted by the wireless power transmitting apparatus in an inner area of the other receiving coil, the multi-level power can be received without expanding the area where the receiving coils are disposed.

Further, according to the present disclosure, the full-bridge rectifying circuit can be connected to an output end of any one of two receiving coils and the half-bridge rectifying circuit can be connected to the output of the other one of two receiving coils, so that the power can be received in combination of a full-bridge rectifying circuit and a half-bridge rectifying circuit based on current being induced into the two receiving coils.

According to the present disclosure, compatibility with the wireless power transmitting apparatus that can adjust an amount of transmitted power or a plurality of wireless power transmitting apparatuses having different amounts of transmitted power or sizes of transmitting coils can be provided by receiving the multi-level power.

Further, according to the present disclosure, the multi-level power can be received without expanding the area where the receiving coils are disposed, thereby reducing an area of the apparatus and making apparatuses larger in size.

Further, according to the present disclosure, power can be received by combining a full-bridge rectifying circuit and a half-bridge rectifying circuit, thereby eliminating a need for a full-bridge rectifying circuit having the number of receiving coils, to reduce an area where the circuit is disposed, in the apparatus and to reduce production cost of apparatuses.

A specific effect of the present disclosure, further to the above-mentioned effect, is described together while describing specific matters to implement the present disclosure.

DETAILED DESCRIPTION OF THE EMBODIMENTS

The above-mentioned objects, features, and advantages of the present disclosure are described in detail with reference to the accompanying drawings. Accordingly, the skilled person in the art to which the present disclosure pertains can easily implement the technical idea of the present disclosure. In the description of the present disclosure, if it is determined that a detailed description of a well-known relevant technology of the present disclosure can unnecessarily obscure the gist of the present disclosure, the detailed description thereof is omitted. Preferred embodiments of the present disclosure are described in detail with reference to the accompanying drawings. In the drawings, same reference numerals are used to refer to same or similar components.

It will be understood that, although the terms "first", "second", and the like can be used herein to describe various components, however, these components should not be limited by these terms. These terms are only used to distinguish one component from another component. Thus, a first component can be a second component unless otherwise stated.

Hereinafter, when any component is arranged in "an upper portion (or a lower portion)" of the component or "on (or under")" of the component, any component can be arranged in contact with an upper surface (or a lower surface) of the component, and another component can be interposed between the component and any component arranged on (or under) the component.

Further, when one component is described as being "connected", "coupled", or "connected" to another component, the component can be directly connected or able to be connected to the other component; however, it is also to be understood that an additional component can be "interposed" between the two components, or the two components can be "connected", "coupled" or "connected" through an additional component.

Unless otherwise stated, each component can be singular or plural throughout the disclosure.

As used herein, the singular forms "a," "an" and "the" are intended to include the plural forms as well, unless the context clearly indicates otherwise. In the present disclosure, it should not be construed that terms such as "including" or "comprising" necessarily include various types of components or various steps described in the present disclosure, and it should be construed terms such as "including" or "comprising" do not include some components or some steps or can include additional components or steps.

In the present disclosure, unless otherwise stated, "A and/or B" means A, B or A and B.

The present disclosure relates to a multi-level power compatible wireless power receiving apparatus, and more particularly, to a wireless power receiving apparatus capable of receiving multi-level power transmitted by a wireless power transmitting apparatus.

The wireless power receiving apparatus according to one or more embodiments of the present disclosure is described below in detail with reference to FIGS. 2 to 9. All components of the wireless power receiving apparatus according to all embodiments of the present disclosure are operatively coupled and configured.

Figure 2:
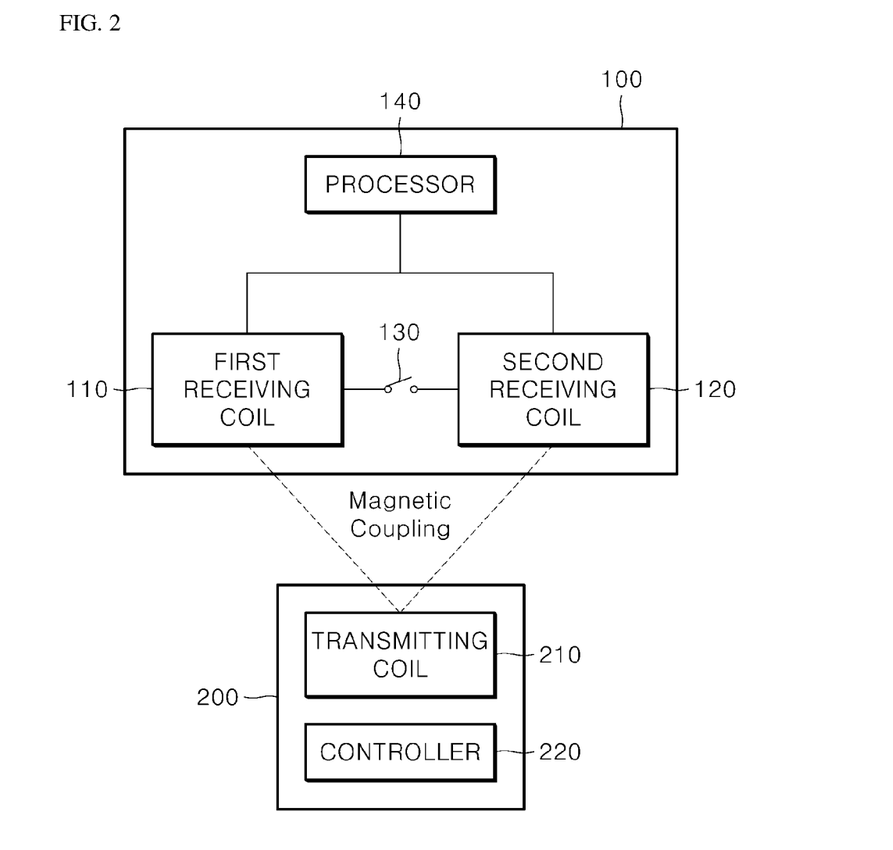
FIG. 2 is a block diagram showing a wireless power receiving apparatus and a wireless power transmitting apparatus according to an embodiment of the present disclosure.

FIG. 2 is a block diagram showing a wireless power receiving apparatus and a wireless power transmitting apparatus according to an embodiment of the present disclosure.

Figure 3:
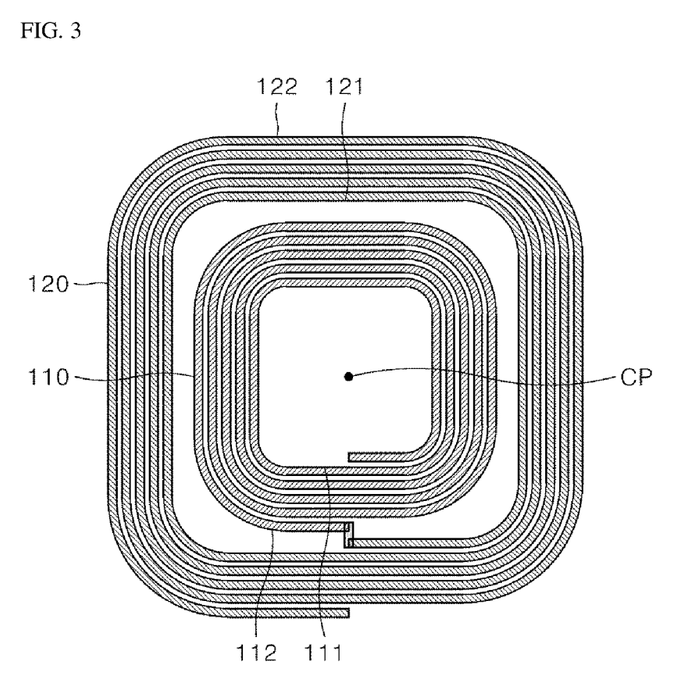
FIGS. 3 and 4 respectively show example arrangements of first receiving coils and second receiving coils.
Figure 4:
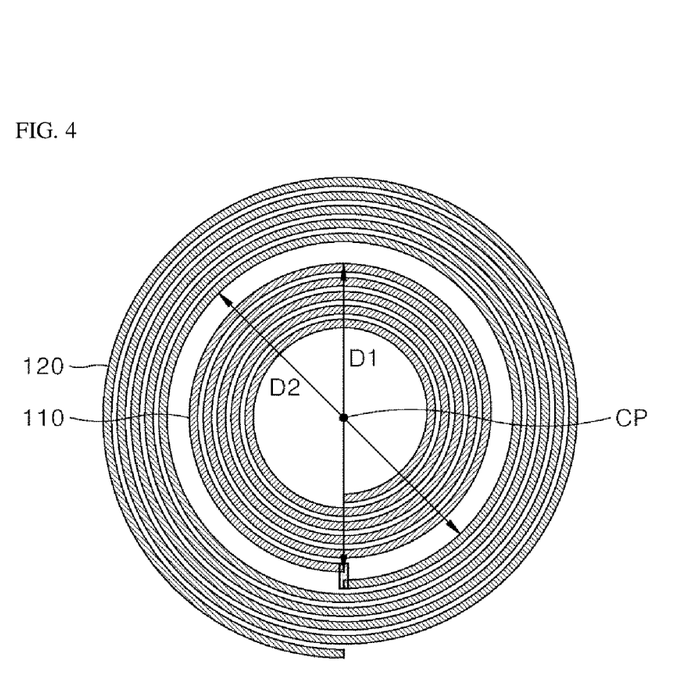

FIGS. 3 and 4 respectively show examples of arrangements of first receiving coils and second receiving coils.

Figure 5:
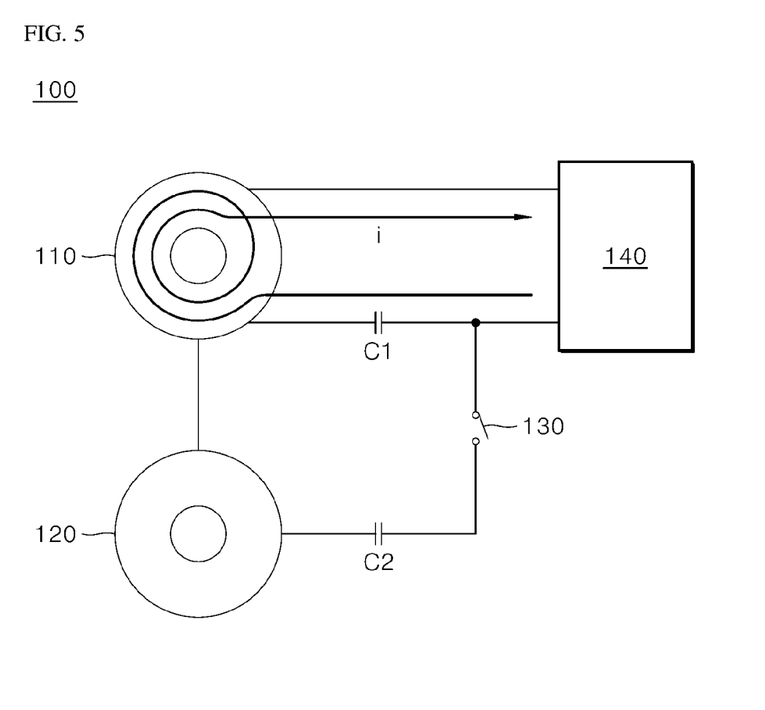
FIG. 5 shows flow of induced current generated based on a first working coil electrically separated from a second receiving coil.
Figure 6:
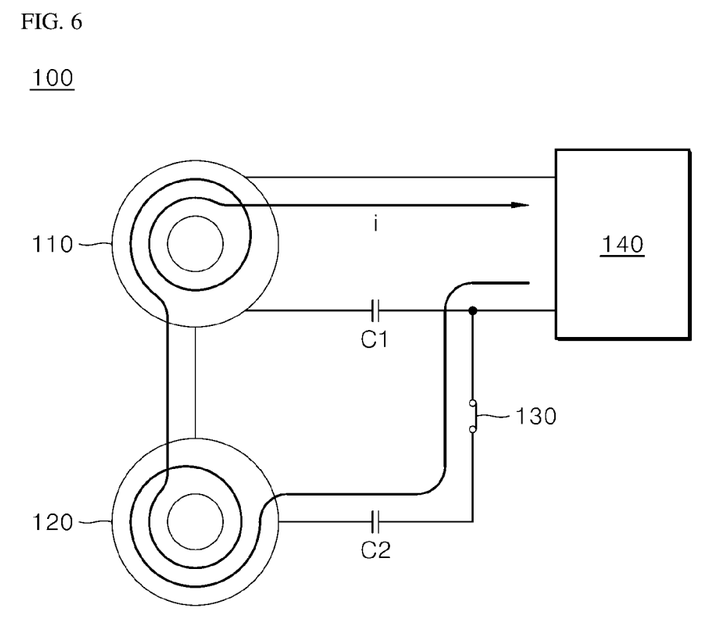
FIG. 6 shows flow of induced current generated based on a first receiving coil electrically connected to a second receiving coil.

FIG. 5 shows flow of induced current generated based on a first receiving coil electrically separated from a second receiving coil. FIG. 6 shows flow of induced current based on the first receiving coils electrically connected to a second receiving coil.

Figure 7:
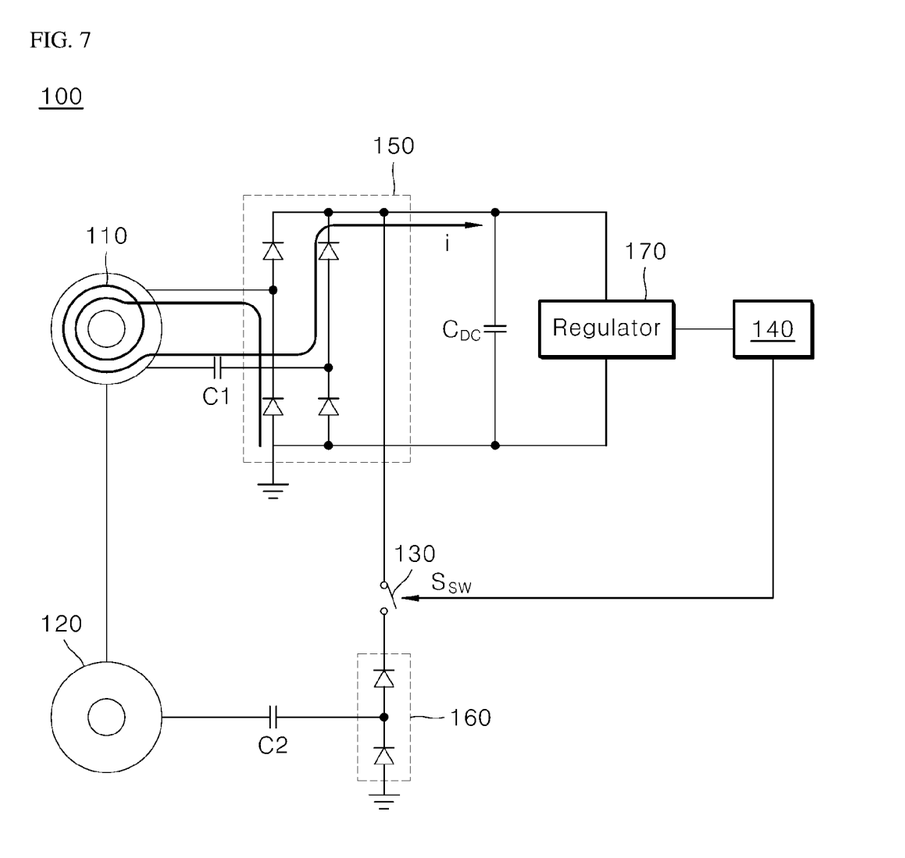
FIG. 7 is a circuit diagram showing a current induced into a first receiving coil provided to a processor.
Figure 8:
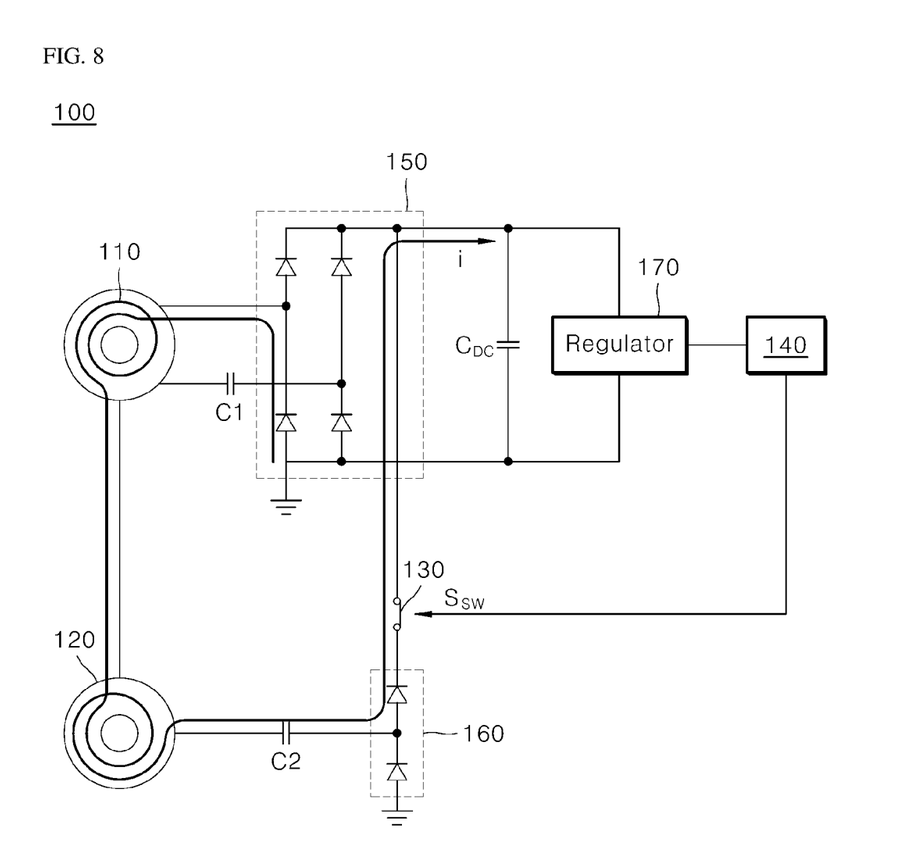
FIG. 8 is a circuit diagram showing currents induced into a first receiving coil and a second receiving coil provided to a processor.

FIG. 7 is a circuit diagram showing current induced into a first receiving coil provided to a processor. FIG. 8 is a circuit diagram showing currents induced into a first receiving coil and a second receiving coil provided to a processor.

Figure 9:
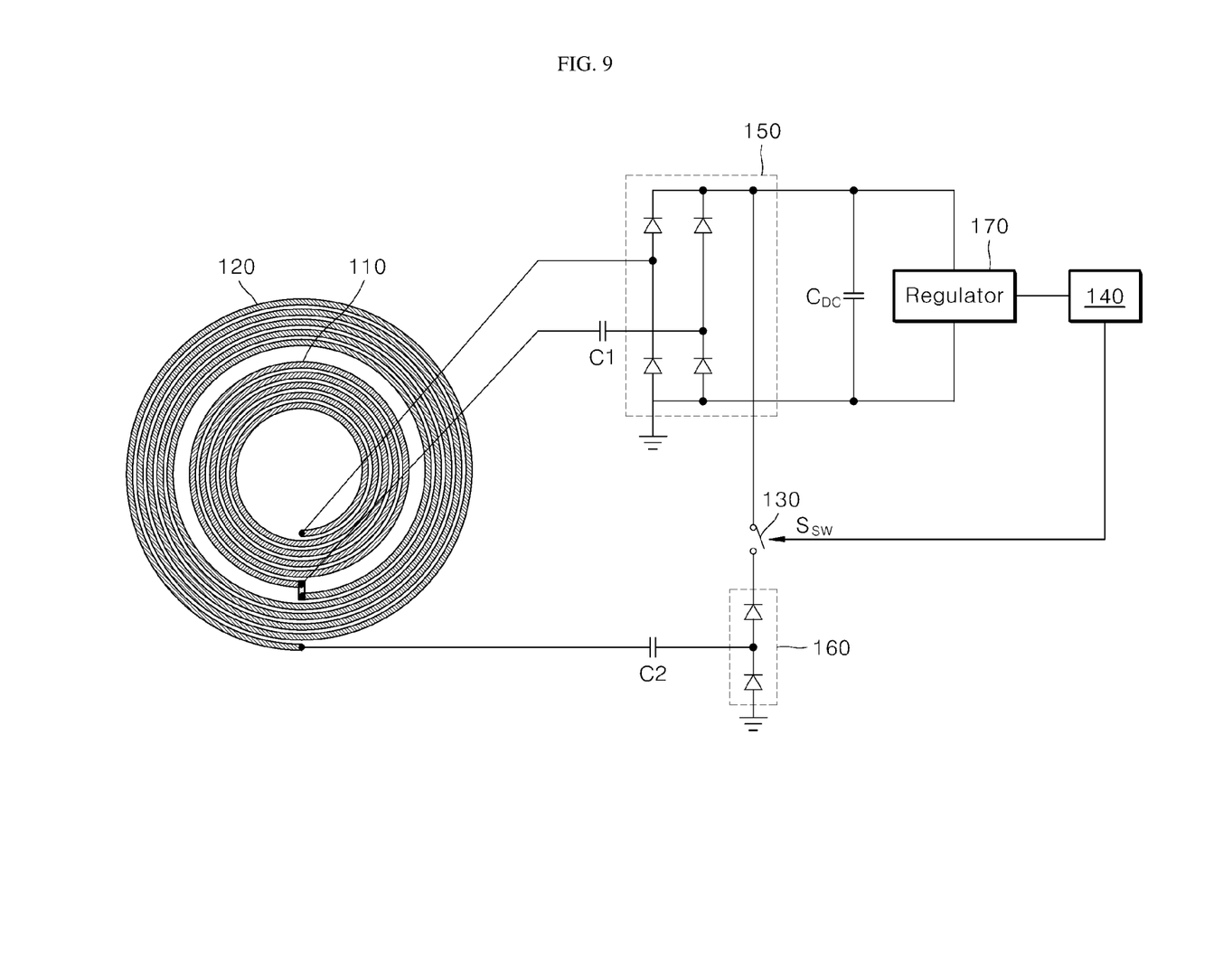
FIG. 9 shows connection relationship between receiving coils and circuits, in arrangement of the first receiving coil and the second receiving coil shown in FIG. 4.
Figure 10:
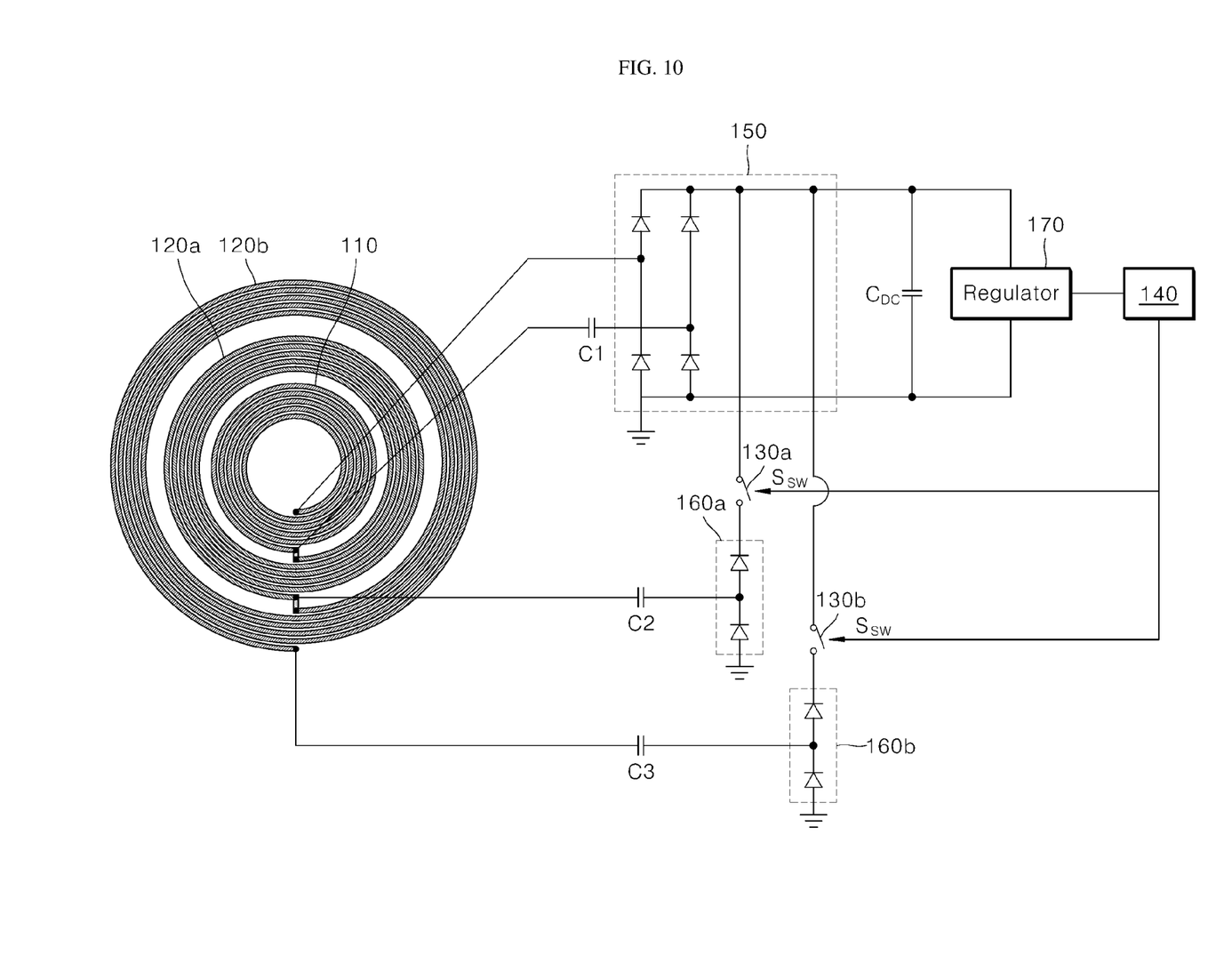
FIG. 10 shows connection relationship between receiving coils and circuits when three receiving coils are disposed.

FIG. 9 shows connection relationships between receiving coils and circuits, in arrangement of each of a first receiving coil and a second receiving coil shown in FIG. 4. FIG. 10 shows a connection relationship between each of receiving coils and a circuit when three receiving coils are arranged.

Referring to FIG. 2, according to an embodiment of the present disclosure, a wireless power receiving apparatus 100 can be aligned with a wireless power transmitting apparatus 200 to be operated. More specifically, the wireless power receiving apparatus 100 and the wireless power transmitter 200 can be aligned so that receiving coils (e.g., a first receiving coil 110 and/or a second receiving coil 120) in the wireless power receiving apparatus 100 are disposed on a transmitting coil 210 in the wireless power transmitting apparatus 200, and thus, the receiving coil can be magnetically coupled to the transmitting coil 210.

Meanwhile, a controller 220 in the wireless power transmitting apparatus 200 can control an inverter to control an amount of current flowing through the transmitting coil 210, thereby adjusting the amount of power provided to the wireless power receiving apparatus 100.

More specifically, the controller 220 can apply, based on the receiving coil magnetically coupled to the transmitting coil 210, a current to the transmitting coil 210 and a magnetic field can occur in the transmitting coil 210 based on a magnitude of applied current. The current can be induced into the receiving coil based on the intensity of the magnetic field generated by the transmitting coil 210 and the current induced into the receiving coil can be provided to batteries or various kinds of loads connected to the wireless power receiving apparatus 100.

In the method for transmitting the wireless power using the electromagnetic induction phenomenon, the amount of power that can be provided from the wireless power transmitting apparatus 200 to the wireless power receiving apparatus 100 can be limited based on the fixed size of the receiving coil.

More specifically, the intensity of magnetic field generated by the transmitting coil 210 can increase based on the size of the transmitting coil 210 increasing based on changes in the wireless power transmitting apparatus 200 itself or the amount of current flowing through the transmitting coil 210 increasing under the control of the controller 220 of the wireless power transmitting apparatus 200. Based on limiting the size of the receiving coil to a predetermined size, even when the intensity of magnetic field generated by the transmitting coil 210 increases, an amount of interlinkage of magnetic field with respect to the receiving coil is limited to the size of the receiving coil, thereby limiting the amount of power provided to the wireless power receiving apparatus 100.

The limitation causes a decrease in power transmission efficiency between the wireless power transmitting apparatus 200 and the wireless power receiving apparatus 100. The present disclosure provides a wireless power receiving apparatus 100 that includes a plurality of receiving coils to improve the power transmission efficiency and can receive the multi-level power by selectively connecting the plurality of receiving coils to one another.

Referring back to FIG. 2, according to an embodiment of the present disclosure, the wireless power receiving apparatus 100 can include a first receiving coil 110, a second receiving coil 120, a switch 130, and a processor 140. In one embodiment, FIG. 2 shows the wireless power receiving apparatus 100, and components of the wireless power receiving apparatus 100 are not limited to an example shown in FIG. 2. Some components can be added, changed, or deleted as necessary.

Induction current can be generated by the first receiving coil 110 through electromagnetic induction.

More specifically, based on the wireless power transmitting apparatus 200 and the wireless power receiving apparatus 100 being aligned, an induced current can be generated by the first receiving coil 110 based on a magnetic field generated by the transmitter coil 210.

The first receiving coil 110 can be or can include a flat coil and can be wound clockwise or counterclockwise. Connection terminals for electrical connection with the processor 140 described below can be provided at both ends of the first receiving coil 110.

The second receiving coil 120 can be electrically connected in series with the first receiving coil 110 by a switch 130.

More specifically, the first receiving coil 110 and the second receiving coil 120 can be electrically connected or electrically separated (e.g., electrically disconnected) through the switch 130, and the switch 130 can be controlled by the processor 140 described below.

Similar to the first receiving coil 110, the second receiving coil 120 can be or include a flat coil, and can be wound clockwise or counterclockwise, and connection terminals can be provided at both ends of the second receiving coil 120, respectively, for electrical connection between the first receiving coil 100 and the processor 140.

As a result, the first receiving coil 110 can have one end and the other end of the first receiving coil 110 connected to the processor 140 through each connection terminals to form a closed circuit through which induced current can flow, when the switch 130 is in an off-state. Further, the second receiving coil 120 has one end of the second receiving coil 120 connected to one end of the first receiving coil 110 and the other end of the second receiving coil 120 connected to the processor 140 through connection terminals, to form a closed circuit in which the induced current can flow when the switch 130 is in an on-state.

The arrangement of the first receiving coil 110 and the second receiving coil and 120 is described below in detail with reference to FIGS. 3 and 4. To this end, connection relationship between the receiving coils 110 and 120 and the processor 140 is omitted, in FIGS. 3 and 4.

A center of the first receiving coil 110 and a center of the second receiving coil 120 can be the same.

For example, referring to FIG. 3, the first receiving coil 110 and the second receiving coil 120 can have rectangular shapes. At this time, a center point of the first receiving coil 110 and a center point of the second receiving coil 120 can be the same. The center point can represent a center of gravity of each of receiving coils 110 and 120, or can represent the center of each of receiving coils 110 and 120.

In another example, referring to FIG. 4, the first receiving coil 110 and the second receiving coil 120 can have circular or elliptical shapes. At this time, the center point (a point indicating the center of a circle or an ellipse) of the first receiving coil 110 and the center point (a point indicating the center of a circle or an ellipse) of the second receiving coil 120 can be the same.

As the center of the first receiving coil 110 and the center of the second receiving coil 120 are the same, the magnetic field generated by a flat transmitting coil 210 can be evenly interlinked to the first receiving coil 110 and/or the second receiving coil 120 based on a distance from the center of the first receiving coil 110 and the second receiving coil 120, thereby improving the uniformity in the power transmission.

Meanwhile, the first receiving coil 110 can be disposed in an inner area of the second receiving coil 120.

Referring back to FIG. 3, for example, the first receiving coil 110 and the second receiving coil 120 can have a rectangular ring shape having outer edges 112 and 122 and inner edges 111 and 121. In this case, the inner areas of receiving coils 110 and 120 can be surrounded by the inner edges 111 and 121 of the receiving coils 110 and 120, respectively.

The first receiving coil 110 can be disposed in an area surrounded by the inner edge 121 of the second receiving coil 120. In other words, the first receiving coil 110 can be disposed such that an area surrounded by the outer edge 112 is included in an area surrounded by the inner edge 121 of the second receiving coil 120. To this end, the distance from the center point of the first receiving coil 110 to the outer edge 112 of the first receiving coil 110 can be less than the distance from the center point of the second receiving coil 120 to the inner edge 121 of the second receiving coil 120.

In another example, referring back to FIG. 4, the first receiving coil 110 and the second receiving coil 120 can be circular flat coils having the same center. The outer diameter of the first receiving coil 110 can be less than the inner diameter of the second receiving coil 120. The outer diameter of the first receiving coil 110 can correspond to a distance between two points. The two points can be provided in a line having a center point of the first receiving coil 110 and extending with respect to the center point of the first receiving coil 110 and connecting a point of the outer edge 112 and a point of the outer edge 122. The inner diameter of the second receiving coil 120 can correspond to a distance between two points. The two points can be provided in a line having a center point of the second receiving coil 120 and extending with respect to the center point of the second receiving coil 120 and connecting a point of the inner edge 111 and a point of the inner edge 121.

As shown in FIG. 4, an outer diameter of the first receiving coil 110 can be D1, and an inner diameter of the second receiving coil 120 can be D2. At this time, the inner diameter D2 can be greater than the outer diameter D1. Accordingly, the first receiving coil 110 can be disposed in the inner area of the second receiving coil 120.

According to the present disclosure, the first receiving coil 110 can be disposed in the inner area of the second receiving coil 120 so that the multi-level power can be received without expanding the area where the receiving coil is disposed, thereby reducing areas of apparatuses and making apparatuses smaller in size.

Meanwhile, as described above, as the first receiving coil 110 forms a closed circuit regardless of the operation of the switch 130, based on the first receiving coil 110 being electrically separated from the second receiving coil 120 by the switch, the current can be induced into the first receiving coil 110.

Referring to FIG. 5, based on the switch 130 being controlled to be turned off to electrically separate the first receiving coil 110 from the second receiving coil 120, the first receiving coil 110 is only electrically connected to the processor 140 to form a closed circuit. Accordingly, no current is induced into the second receiving coil 120, but current can be induced only into the first receiving coil 110.

Meanwhile, based on the first receiving coil 110 being electrically connected to the second receiving coil 120 by the switch 130, current can be induced into the first receiving coil 110 and the second receiving coil 120.

Referring to FIG. 6, when the switch 130 is controlled to be turned on so that the first receiving coil 110 and the second receiving coil 120 are electrically connected to each other, the first receiving coil 110 and the second receiving coil 120 can be electrically connected to the processor 140 form a closed circuit. Accordingly, based on operating the first receiving coil 110 and the second receiving coil 120 as one coil, current can be induced into the first receiving coil 110 and the second receiving coil 120.

Meanwhile, as shown in FIGS. 5 and 6, the receiving coils 110 and 120 can be connected to resonance capacitors C1 and C2, respectively, and a resonance frequency can be determined based on inductance of each of receiving coils 110 and 120 and capacitance of each of resonance capacitors C1 and C2.

More specifically, the first receiving coil 110 can be connected in series with the first resonance capacitor C1, and the resonance frequency of the circuit including the two elements can be determined based on the inductance of the first receiving coil 110 and the capacitance of the first resonance capacitor C1. Further, the second receiving coil 120 can be connected in series with the second resonance capacitor C2, and the resonance frequency of the circuit including the two elements can be determined based on the inductance of the second receiving coil 120 and the capacitance of the second resonance capacitor C2.

Referring back to FIG. 5, based on the first receiving coil 110 electrically separated from the second receiving coil 120, the first receiving coil 110 and the first resonance capacitor C1 are connected to each other in series to form a first resonance circuit, which corresponds to a closed circuit. At this time, the resonance frequency of the first resonance circuit can be determined based on a value in which the inductance of the first receiving coil 110 is multiplied by the capacitance of the first resonance capacitor C1.

Further, referring back to FIG. 6, based on the first receiving coil 110 being connected to the second receiving coil 120, the first receiving coil 110, the second receiving coil 120, and the second resonance capacitor C2 can be connected to each other in series to form a second resonance circuit, which corresponds to a closed circuit. In this case, the resonance frequency of the second resonance circuit can be determined based on a value obtained by multiplying the capacitance of the second resonance capacitor C2 by the sum of the inductance of the first receiving coil 110 and the inductance of the second receiving coil 120.

As described above, based on providing the first resonance circuit and the second resonance circuit, the resonance frequency of the first resonance circuit and the resonance frequency of the second resonance circuit can be the same.

The receiving coil in the wireless power receiving apparatus 100 can receive power through magnetic coupling with the transmitting coil 210 in the wireless power transmitting apparatus 200 at a specific resonance frequency. Accordingly, the wireless power receiving apparatus 100 can receive power with very high efficiency based on the current having a frequency adjacent to the resonance frequency applied to the transmitting coil 210.

The first resonance circuit and the second resonance circuit are switched to each other based on the operation of the switch 130. The resonance frequency of the first resonance circuit can be required to be identical to the resonance frequency of the second resonance circuit to receive the power with predetermined efficiency regardless of operation of the switch 130.

To this end, the capacitance of the second resonance capacitor C2 can be less than the capacitance of the first resonance capacitor C1.

The total inductance of the first resonance circuit shown in FIG. 5 can be determined based on the inductance of the first receiving coil 110, and the total inductance of the second resonance circuit shown in FIG. 6 can be determined based on a sum of the inductance of the first receiving coil 110 and the inductance of the second receiving coil 120.

Meanwhile, as described above, as the resonance frequency of each resonance circuit is determined based on the product of the total inductance and the total capacitance of each of resonance circuits, in order to set the resonance frequency of the second resonance circuit to be the same as the resonance frequency of the first resonance circuit, the capacitance of the second resonance capacitor C2 can be less than the capacitance of the first resonance capacitor C1.

Referring to FIGS. 7 to 9, a process is described below in detail in which a current induced into the first receiving coil 110 and/or the second receiving coil 120 is provided to the processor 140.

A first receiving coil 110 and a processor 140 are connected through a full-bridge rectifying circuit 150, and the current induced into the first receiving coil 110 can be provided to the processor 140 through full-bridge rectifying circuit 150.

Referring to FIG. 7, a full-bridge rectifying circuit 150 can be provided between the first receiving coil 110 and the processor 140. Based on the switch 130 being controlled to be turned off, a current can be induced into the first receiving coil 110, and the induced current can flow through a lower diode of a left leg of the full-bridge rectifying circuit 150, the first receiving coil 110, and an upper diode of a right leg of the full-bridge rectifying circuit 150. As a result, the current induced into the first receiving coil 110 can be full-wave rectified, and the rectified current can be provided to the processor 140.

Meanwhile, the second receiving coil 120 and the processor 140 are connected through a half-bridge rectifying circuit 160. As shown in FIG. 8, the current can be induced into the first receiving coil 110 and the second receiving coil 120 at the same time and can be provided to the processor 140 through any one of legs of the full-bridge rectifying circuit 150 and the half-bridge rectifying circuit 160.

Referring to FIG. 8, a half-bridge rectifying circuit 160 can be provided between the second receiving coil 120 and the processor 140. Based on the switch 130 being controlled to be turned on, current is induced into the first receiving coil 110 and the second receiving coil 120, and the induced current can flow along the lower diode of the left leg of the full-bridge rectifying circuit 150, the first receiving coil 110, the second receiving coil 120, and an upper diode of the half-bridge rectifying circuit 160. As a result, currents induced into the first receiving coil 110 and the second receiving coil 120 can be full-wave rectified, and the rectified current can be provided to the processor 140.

As described above, according to the present disclosure, the power is received by combining the full-bridge rectifying circuit 150 and the half-bridge rectifying circuit 160 and the full-bridge rectifying circuit 150 having the number of receiving coils 110 and 120 may not be required, thereby reducing an area where the circuit is provided in the apparatus and reducing production cost of apparatuses.

Meanwhile, in order to smooth the rectified current, the wireless power receiving apparatus 100 can further include a DC link capacitor $C_{DC}$. Accordingly, the current induced into at least one of the first receiving coil 110 and the second receiving coil 120 can be stored, as a DC link voltage, in the DC link capacitor $C_{DC}$, and the processor 140 can be driven based on the DC link voltage.

Referring back to FIGS. 7 and 8, both the full-bridge rectifying circuit 150 and the half-bridge rectifying circuit 160 can be connected to a DC link capacitor $C_{DC}$. Accordingly, the induced current rectified through the method described above can be stored in the form of a smoothed voltage in the DC link capacitor $C_{DC}$.

The processor 140 can be connected to a DC link capacitor $C_{DC}$ and can be driven by receiving a DC link voltage stored in the DC link capacitor $C_{DC}$.

Meanwhile, a regulator 170 can be further provided at an output terminal of the DC link capacitor $C_{DC}$. Accordingly, the DC link voltage can be converted into a drive voltage to drive the processor 140 by a regulator 170, and the processor 140 can be driven based on the drive voltage.

Specifically, the processor 140 can preset a drive voltage to be supplied for operation. Generally, this drive voltage can be less than the DC link voltage. Accordingly, the regulator 170 can convert the DC link voltage into the drive voltage having a magnitude, e.g., 3.3[V]. The processor 140 can be connected to the regulator 170 and can be driven by receiving a drive voltage converted by the regulator 170.

A method of operating the processor 140 is described below in detail with reference to FIGS. 7 to 9 again.

The processor 140 can be driven based on the induction current generated by the first receiving coil 110, and can control the switch 130 based on the power information included in the induction current to selectively connect the first receiving coil 110 and the second receiving coil 120.

Based on the wireless power transmitting apparatus 200 aligned with the wireless power receiving apparatus 100, a current can be induced into the first receiving coil 110 regardless of an on-state/an off-state of the switch 130. The induced current can be provided to the processor 140 along the path described with reference to FIGS. 7 and 8. In other words, the processor 140 can be driven when the switch 130 is controlled to be turned on and turned off to control operation of the switch 130.

However, a process of controlling the switch 130 by driving the processor 140 based on the switch 130 controlled to be turned off is described below.

Referring back to FIG. 7, the induced current generated by the first receiving coil 110 based on the switch 130 controlled to be turned off can be provided to the processor 140. The processor 140 can be driven (waken-up) based on the induced current and can identify power information included in the induced current. In this case, the power information can include information on an amount of power (hereinafter, referred to as "an amount of transmitted power") that can be transmitted by the wireless power transmitting apparatus 200.

Specifically, the controller 220 of the wireless power transmitting apparatus 200 can generate a modulated signal including power information, and can apply, to the transmitting coil 210, an alternating current including the generated modulated signal. Accordingly, an induction current including a modulation signal can be generated by the first receiving coil 110, and the processor 140 can identify power information by demodulating the modulation signal in the induction current. To this end, the wireless power receiving apparatus 100 can further include any sensor capable of sensing the induced current, and the processor 140 can demodulate the modulated signal in the induced current through the sensor.

For example, the processor 140 can identify the power information through a frequency modulated signal included in the induced current after being driven by the induced current.

The controller 220 of the wireless power transmitting apparatus 200 can generate a frequency modulated signal (e.g., a frequency-shift keying (FSK) modulated signal) including power information. Accordingly, the frequency-modulated AC current can be applied to the transmitting coil 210, and the frequency-modulated AC current can be induced to the first receiving coil 110.

The processor 140 can identify the power information by demodulating the frequency modulated signal included in the induced current after being driven based on the current induced into the first receiving coil 110.

The processor 140 can control the switch 130 based on the identified power information. More specifically, the processor 140 can control the switch 130 to be turned on or turned off based on the amount of transmitted power included in the power information.

As described above, when the size of the receiving coil is fixed, the amount of power that can be received by a wireless power receiving apparatus can be limited. Accordingly, the processor 140 can change the size of the receiving coil by controlling the switch 130 based on the amount of power transmitted by the wireless power transmitting apparatus 200.

Specifically, referring to FIG. 9, the switch 130 can be turned off when the processor 140 is not driven. After the wireless power transmitting apparatus 200 and the wireless power receiving apparatus 100 are aligned, based on a current being applied to the transmitting coil 210, a current can be induced into the first receiving coil 110, and the processor 140 can be driven based on the induced current.

The processor 140 can determine the amount of power transmitted by the wireless power transmitting apparatus 200 based on the induced current. Based on the amount of transmitted power being less than a reference magnitude (e.g., predetermined magnitude), the switch 130 can be controlled to be turned off without change. Based on the amount of transmitted power being greater than a predetermined magnitude, the switch 130 can be controlled to be turned on. Based on the amount of transmitted power being less than the predetermined magnitude, the wireless power receiving apparatus 100 can receive the power only through the first receiving coil 110. Based on the amount of transmitted power being greater than the reference magnitude, the wireless power receiving apparatus 100 can receive the power through the first receiving coil 110 and the second receiving coil 120. When the amount of transmitted power is equal to the reference magnitude, the switch 130 can be set up to turn or not depending on the desired set up. For example, if the amount of transmitted power is equal to or greater than the reference magnitude, the switch 130 can be turned on. In another example, when the amount of transmitted power is less than or equal to the reference magnitude, the switch 30 can be turned off or stay turned off.

That is, based on the amount of power transmitted by the wireless power transmitting apparatus 200 being relatively low, the wireless power receiving apparatus 100 can receive power by adjusting the size of the receiving coil to be relatively less. Based on the amount of power transmitted by the wireless power transmitting apparatus 200 being relatively greater, the wireless power receiving apparatus 100 can receive power by adjusting the size of the receiving coil to be relatively greater.

Further, the operation of the processor 140 is described in detail with reference to FIG. 10.

Referring to FIG. 10, unlike the above-mentioned matter, three receiving coils in a wireless power receiving apparatus 100 can be provided. Hereinafter, receiving coils shown in FIG. 10 can be classified into a first receiving coil 110, a 2-1 receiving coil 120a, and a 2-2 receiving coil 120b according to lengths of inner diameters of receiving coils. A switch that connects the first receiving coil 110 and the 2-1 receiving coil 120a is referred to as "a first switch 130a". A switch that connects a 2-1 receiving coil 120a and a 2-2 receiving coil 120b is referred to as "a second switch 130b".

The switch 130a can be turned off when the processor 140 is not driven. After the wireless power transmitting apparatus 200 and the wireless power receiving apparatus 100 are aligned, based on current being applied to the transmitting coil 210, a current is induced into the first receiving coil 110, and the processor 140 can be driven based on the induced current.

The processor 140 can determine the amount of power transmitted by the wireless power transmitting apparatus 200 based on the induced current. Based on the amount of transmitted power being less than a first reference magnitude, the switch 130a can be controlled to be turned off without change. Based on the amount of transmitted power being identical to or greater than the first reference magnitude, the switch 130a can be controlled to be turned on.

Accordingly, based on the amount of transmitted power being less than the first reference magnitude, the wireless power receiving apparatus 100 can receive the power through the first receiving coil 110. Based on the amount of transmitted power being identical to or greater than the first reference magnitude, the wireless power receiving apparatus 100 can receive the power through the first receiving coil 110 and the 2-1 receiving coil 120a.

Further, based on the amount of transmitted power being identical to or greater than the first reference magnitude, the processor 140 can compare the amount of transmitted power with a second reference magnitude, which is greater than the first reference magnitude. Based on the amount of transmitted power being less than the second reference magnitude, the first switch 130a can only be controlled to be turned on. Based on the amount of transmitted power being identical to or greater than the second reference magnitude, the second switch 130b, in addition to the first switch 130a, can be controlled to be turned on.

Accordingly, based on the amount of transmitted power being identical to or greater than the first reference magnitude and being less than the second reference magnitude, the wireless power receiving apparatus 100 can receive the power through the first receiving coil 110 and the 2-1 receiving coil 120a. Based on the amount of transmitted power being identical to or greater than the second reference, the wireless power receiving apparatus 100 can receive the power through the first receiving coil 110, the 2-1 receiving coil 120a, and the 2-2 receiving coil 120b.

As described above, according to the present disclosure, compatibility with the wireless power transmitting apparatus 200 that can adjust the amount of transmitted power or a plurality of wireless power transmitting apparatuses 200 having different amounts of transmitted power or the sizes of the transmitting coils 210 can be provided by receiving the multi-level power.

Various substitutions, modifications, and changes can be made within the scope that does not deviate from the technical idea of the present disclosure for the skilled person in the art to which the present disclosure pertains, the above-mentioned disclosure is not limited to the above-mentioned embodiment and the accompanying drawings.

What is claimed is:

1. A wireless power receiving apparatus for receiving multi-level power, comprising:
   a first receiving coil in which induction current is generated based on an electromagnetic induction;
   a first resonance capacitor connected to the first receiving coil;

a second receiving coil configured to be selectively connected to the first receiving coil in series, so that the induction current flows through a series connection of the first receiving coil and the second receiving coil, by a switch;

a second resonance capacitor connected to the second receiving coil; and a processor that is driven based on the induction current generated by the first receiving coil, demodulates the induction current to identify power information, controls the switch based on the power information, and selectively and electrically connects the first receiving coil and the second receiving coil based on an operation of the switch, wherein the first receiving coil and the first resonance capacitor form a first resonance circuit, when the series connection of the first receiving coil and the second receiving coil is disconnected by the switch, wherein the first receiving coil, the second receiving coil and the second resonance capacitor form a second resonance circuit, when the first receiving coil is electrically connected to the second receiving coil by the switch, wherein a resonance frequency of the first resonance circuit and a resonance frequency of the second resonance circuit are the same or substantially the same, wherein a capacitance of the second resonance capacitor is less than a capacitance of the first resonance capacitor, wherein the processor determines an amount of transmitted power that is transmitted by a wireless power transmitting apparatus based on the power information, and wherein in response to the amount of transmitted power being less than a reference magnitude, the processor controls the switch to be turned off to electrically disconnect the first and second receiving coils from each other, and in response to the amount of transmitted power being equal to or greater than the reference magnitude, the processor controls the switch to be turned on to electrically connect the first and second receiving coils to each to other.

2. The wireless power receiving apparatus of claim 1, wherein a center of the first receiving coil and a center of the second receiving coil are the same or substantially the same.

3. The wireless power receiving apparatus of claim 1, wherein the first receiving coil is disposed within an inner area of the second receiving coil.

4. The wireless power receiving apparatus of claim 1, wherein an area surrounded by an outer edge of the first receiving coil is disposed within an area surrounded by an inner edge of the second receiving coil.

5. The wireless power receiving apparatus of claim 1, wherein the first receiving coil and the second receiving coil have substantially circular or rectangular shapes having the same center, and an outer diameter of the first receiving coil is less than an inner diameter of the second receiving coil.

6. The wireless power receiving apparatus of claim 1, wherein current is induced into the first receiving coil when the series connection of the first receiving coil and the second receiving coil is disconnected by the switch, or wherein current is induced into the first receiving coil and the second receiving coil when the first receiving coil is electrically connected to the second receiving coil by the switch.

7. The wireless power receiving apparatus of claim 1, wherein the first receiving coil and the processor are connected through a full-bridge rectifying circuit.

8. The wireless power receiving apparatus of claim 7, wherein a current induced into the first receiving coil is provided to the processor through the full-bridge rectifying circuit.

9. The wireless power receiving apparatus of claim 7, wherein the second receiving coil and the processor are connected through a half-bridge rectifying circuit.

10. The wireless power receiving apparatus of claim 9, wherein a current induced into both the first receiving coil and the second receiving coil is provided to the processor through any one of legs of the full-bridge rectifying circuit and the half-bridge rectifying circuit.

11. The wireless power receiving apparatus of claim 1, further comprising a DC link capacitor, wherein a current induced into at least one of the first receiving coil and the second receiving coil is stored as a DC link voltage in the DC link capacitor, and the processor is driven based on the DC link voltage.

12. The wireless power receiving apparatus of claim 11, further comprising a regulator, wherein the DC link voltage is converted into a drive voltage by the regulator, and the processor is driven based on the drive voltage.

13. The wireless power receiving apparatus of claim 1, wherein the processor identifies the power information based on a frequency modulated signal included in the induction current after the processor is driven based on the induction current.

* * * * *